Mar. 27, 1923.

G. F. ECKART
MOTOR VEHICLE
Filed June 5, 1920

INVENTOR
George F. Eckart
By James N. Ramsey
ATTORNEY

Mar. 27, 1923.  
G. F. ECKART  
MOTOR VEHICLE  
Filed June 5, 1920  
1,449,812  
4 sheets-sheet 4
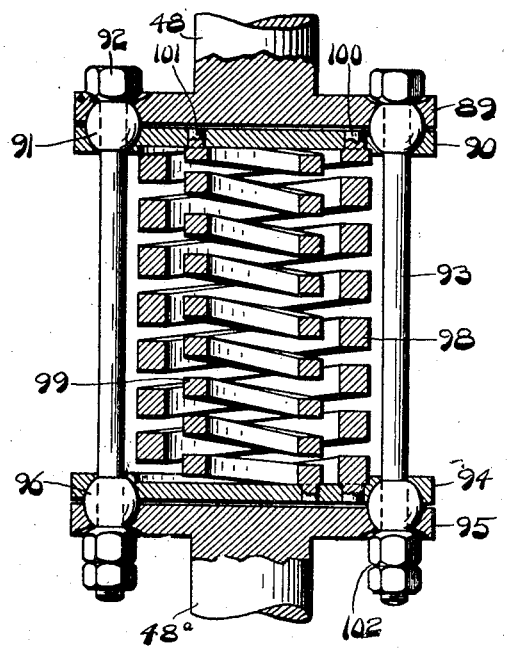
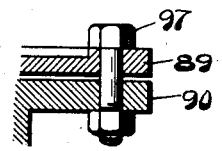
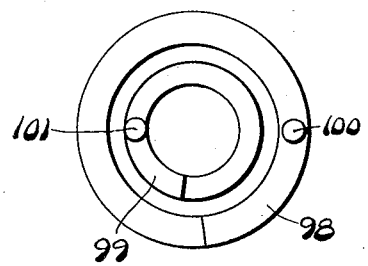
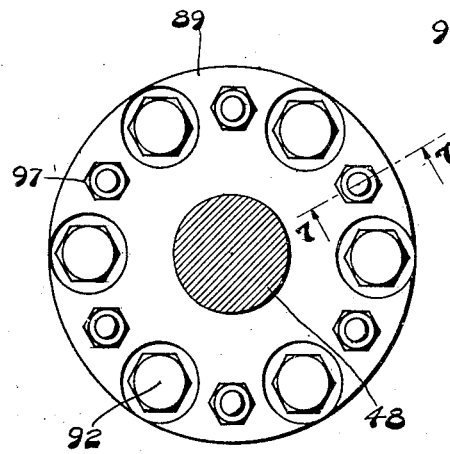

Patented Mar. 27, 1923.

1,449,812

UNITED STATES PATENT OFFICE.

GEORGE F. ECKART, OF CINCINNATI, OHIO.

MOTOR VEHICLE.

Application filed June 5, 1920. Serial No. 386,688.

*To all whom it may concern:*

Be it known that I, GEORGE F. ECKART, a citizen of the United States, residing at Cincinnati, in the county of Hamilton and State of Ohio, have invented certain new and useful Improvements in Motor Vehicles, of which the following is a specification.

My invention relates to the driving mechanism and particularly to that portion of the driving mechanism of a motor vehicle which lies to the rear of the construction and embodies the rear axle, differential, and drive wheel elements.

The construction to be hereinafter set forth is particularly designed for automobile trucks of great capacity and is intended to provide means whereby the capacity of trucks may be very materially increased over any heretofore so that heavier loads may be carried.

A further object is to produce a construction which permits the use of four drive wheels, thereby reducing the wear on the tires and at the same time permitting of the use of four drive wheels at the point where the greatest tractive effort is afforded by the weight of the load carried by the truck.

An additional object is to produce a four wheel drive which is driven by a single drive shaft, but which provides means whereby the parts may adjust themselves to the varying inequalities of the surface over which the truck moves.

Four wheel drive trucks are generally understood to be driven by two rear road wheels and two front road wheels, the front wheels usually also operating as the steering wheels of the vehicle, such a four wheel drive necessitating the use of flexible or universal joints and gear connections with two drive shafts. In my improved construction the use of flexible or universal joints, double drive shafts and gear connections is largely eliminated and it will be seen that in general the conditions are not changed over a two wheel drive.

A further departure from usual construction is to be found in the use of two rear axles which are connected in a flexible manner with the mounting or vehicle springs connected therewith to produce a different reaction or recoil than is produced under present conditions.

These and other objects or advantages are attained in the truck construction described in the following specification and illustrated in the accompanying drawings in which:

Fig. 4 is an enlarged longitudinal sectional view of a flexible drive joint embodying a detail of my invention;

Fig. 5 is a plan view of the flexible drive joint shown in Fig. 4;

Fig. 6 is a plan view of the helical springs in the joint shown in Fig. 4; and

Fig. 7 is a fragmental sectional view of a detail of the joint shown in Fig. 4 and taken on the line 7—7 of Fig. 5.

Figure 1:
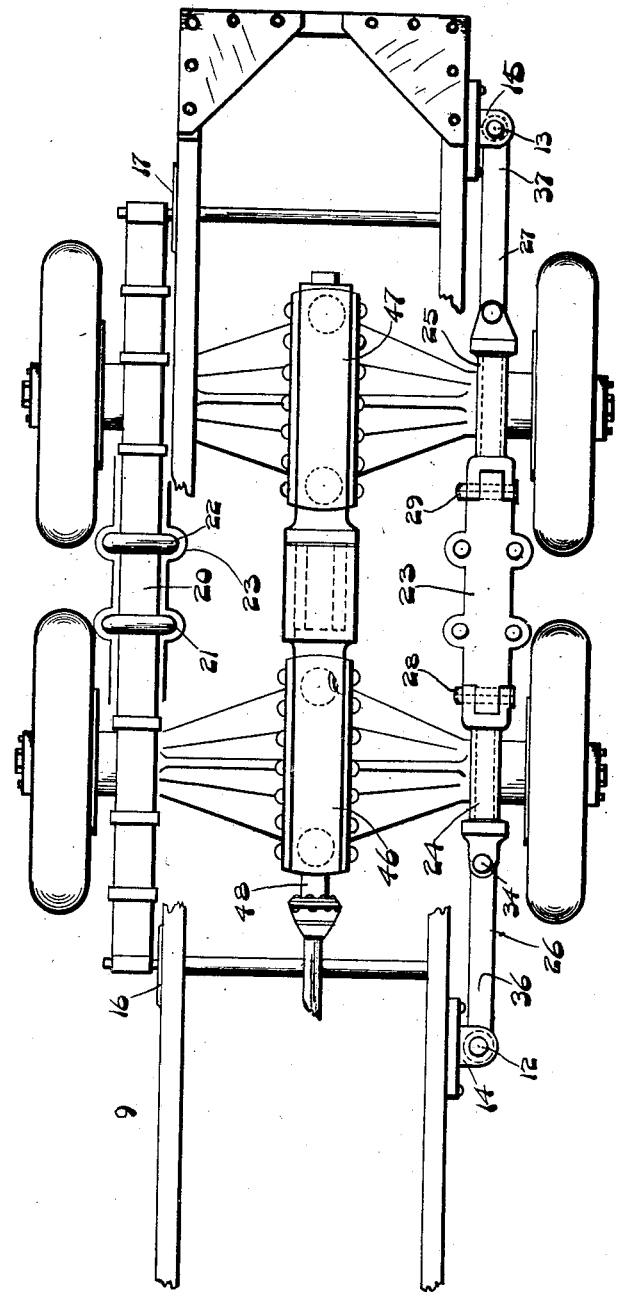
Fig. 1 is a fragmental plan view of the rear portion of a truck embodying my invention.
Figure 2:
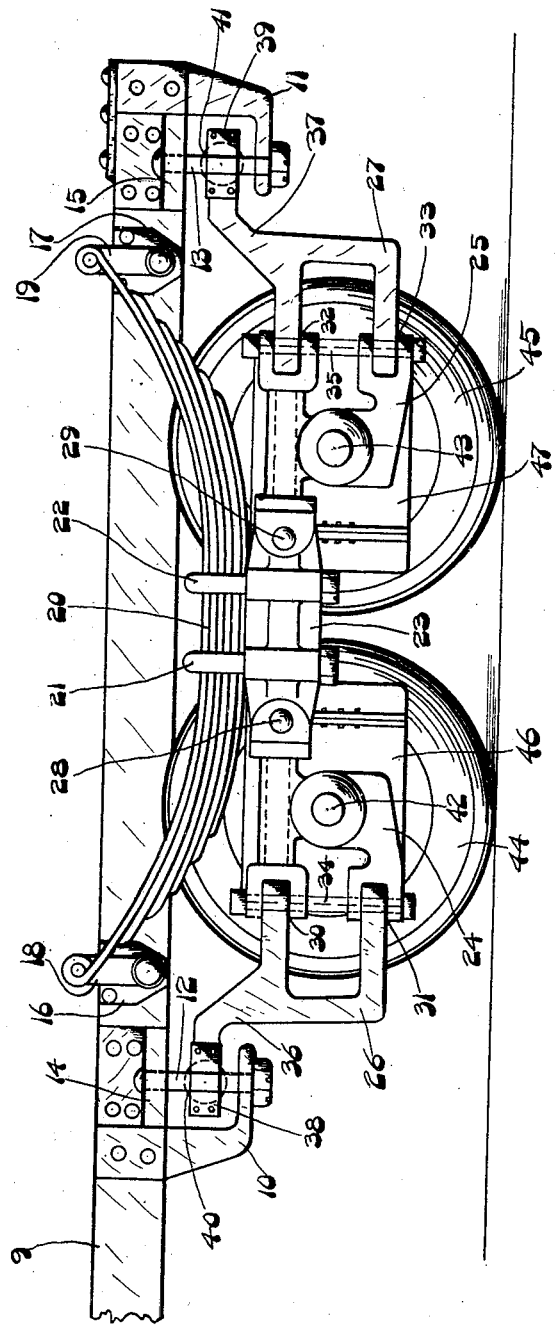
Fig. 2 is a side elevation of that portion of the truck shown in Fig. 1.

In my improved motor vehicle construction the chassis 9 is of usual construction, being designed to support the increased load which my truck is capable of carrying. This chassis is provided on each side with brackets 10 and 11 which extend downwardly and support the lower ends of pins 12 and 13, the upper ends of which are located in outwardly projecting brackets 14 and 15 which are secured to the chassis adjacent to the brackets 10 and 11. Upon brackets 16 and 17 which are attached to the chassis frame, are swinging links 18 and 19 which are connected with the ends of the vehicle springs 20. These springs are connected by means of spring clips 21 and 22 to blocks 23 which act as connecting links between journal box bearings 24 and 25 which in turn act as intermediate connecting links between the central connecting link 23 and forked links 26 and 27. The pivotal connection of links 23, 24 and 25 with each other is at points 28 and 29 in such a manner as to permit the swinging thereof in vertical planes, the pivotal connections of links 24 and 26, 25 and 27 with each other being at points 30, 31 and 32, 33 upon vertical pins 34 and 35 so that movement of these links in horizontal planes with relation to one another is afforded. Links 26 and 27 are connected with pins 12 and 13 by being provided with forwardly and rearwardly extending ends 36 and 37 which are provided with spherical sockets 38 and 39 adapted to engage balls 40 and 41 upon the respective pins 12 and 13. Journal box bearings 24 and 25 carry the axles 42 and 43 upon which the road wheels 44 and 45 are mounted, gear casings 46 and 47, the contents of which will now be described, being provided in suitable position for the enclosed mechanism to drive the road wheels.

Figure 3:
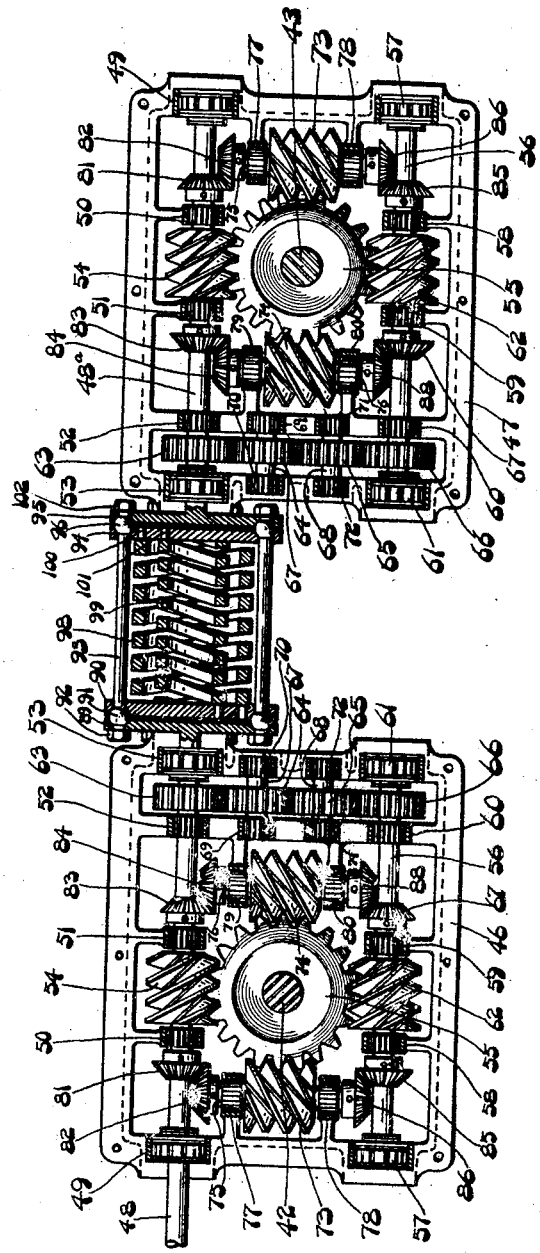
Fig. 3 is an enlarged sectional view of the driving mechanism embodying a detail of my invention, the covers being removed from the gear housings to disclose the arrangement of the gears therein.

The driving mechanism within the gear casings and the flexible coupling between them is shown in Fig. 3. Inasmuch as each casing contains the same mechanism, but one mechanism will be described, the same reference numerals referring to like parts in each. Passing into casing 46 is the drive shaft 48 which is mounted therein in bearings 49, 50, 51, 52 and 53 and which carries a worm 54 between the bearings 50 and 51 in position to mesh with and drive worm gear 55 on axle 42. At the bottom of the casing on the opposite side of the worm gear 55 a shaft 56 is located, this shaft being journalled in bearings 57, 58, 59, 60 and 61, and carrying a worm 62 which also meshes with worm gear 55. Motion is communicated to shaft 56 from drive shaft 48 through a series of spur gears 63, 64, 65 and 66, gears 63 and 66 being located between bearings 52 and 53, 60 and 61, while gears 64 and 65 are mounted on short shafts 67 and 68 journalled in bearings 69 and 70, 71 and 72 of the casing. At right angles to the worms 54 and 62 are located the worms 73 and 74 which are mounted upon the respective shafts 75 and 76 and are journalled in bearings 77 and 78, 79 and 80. These worms 73 and 74 are driven for operation with worm gear 55 by a series of pairs of mitre gears 81 and 82, 83 and 84, 85 and 86, 87 and 88.

The flexible coupling which connects the two casings is fully shown in Figs. 4 to 7 inclusive, and although the subject of Patent No. 1,337,646, granted to me upon April 20, 1920, I will describe the construction thereof in brief as follows. The drive shaft 48 terminates in a disc 89 which in cooperation with a plain disc 90 forms sockets for the balls 91 slidably mounted on the head ends 92 of a series of bolts 93 to permit movement of the bolts in the sockets. The opposite end of the coupling is similarly constructed, having a disc 94 which in cooperation with a disc 95 attached to drive shaft extension 48ª acts to form a series of spherical sockets for the reception of a series of balls 96 on the nut ends of bolts 93. To hold discs 89 and 90 as well as discs 94 and 95 together and in properly adjusted relation with each other I have provided a series of short bolts 97 located between adjacent ones of the set of bolts 93. Between the discs 90 and 94 I have provided an external coil spring 98 and an internal coil 99 having ends 100 and 101 which enter the discs 90 and 94. These springs serve to maintain a certain element of solidity to the coupling while at the same time permitting it to be flexed in torsion cross-wise. Nuts and lock nuts 102 are provided on the threaded ends of the bolts for tensioning the coupling and its springs to the proper extent.

The action to be had in driving the mechanism above described is to divide up the wear on the various parts and to permit of better lubrication while at the same time distributing the application of power at points around a whole circle thereby eliminating leverage or so called thrust. This results in eliminating excessive friction and in keeping the oil cool, which results in perfect lubrication. It can be seen that the power is partly transmitted through mitre gears and that the other portion of the power is transmitted through spur gears. Wearing of the worms and mitre gears reduces the pressure and permits of better lubrication between the parts, thus in turn relieving the excessive wear on the parts.

The manner in which the wheel axles are mounted with relation to the chassis is also believed to be new inasmuch as the horizontally and vertically movable joint combination together with the ball and socket construction at the ends of the axle mounting connections permits the dipping and angling of the parts relatively to one another while in motion without any undue side strains.

An advantage attained in my construction is the location of the vehicle springs 20 with relation to the axles since they are located on and connected to the connecting link 23 which connects the rear axle journal boxes 24 and 25, thereby giving a different reaction or recoil of the transmission than in present construction in which the recoil is directly at the point of connection of the axle with the spring.

Having thus described my invention, what I claim is:

The combination in a motor vehicle of a chassis, axle housings mounted thereon, an axle in each housing, wheels on said axles, a worm drive mechanism mounted in each of said housings, a shock absorbing and universally acting spring coupling between and connecting said worm drive mechanisms, and a pair of vertically yielding spring mountings connecting the front and rear axle housings, substantially as set forth and for the purposes specified.

GEORGE F. ECKART.